(12) United States Patent
Kusakabe (10) Patent No.: US 8,736,901 B2
(45) Date of Patent: May 27, 2014

(54) INFORMATION PROCESSING APPARATUS, INFORMATION PROCESSING METHOD, AND STORAGE MEDIUM

(75) Inventor: Yuki Kusakabe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 390 days.

(21) Appl. No.: 13/011,183

(22) Filed: Jan. 21, 2011

(65) Prior Publication Data

US 2011/0188058 A1 Aug. 4, 2011

(30) Foreign Application Priority Data

Feb. 1, 2010 (JP) ................................ 2010-020021

(51) Int. Cl.
*G06K 15/00* (2006.01)
*G06F 3/12* (2006.01)
*G06F 19/00* (2011.01)
*G06F 15/16* (2006.01)

(52) U.S. Cl.
USPC ........... 358/1.9; 358/1.12; 358/1.1; 358/1.15; 700/132; 709/204; 709/225; 709/203; 705/14.49; 705/14.27

(58) Field of Classification Search
USPC .......................... 358/1.12, 1.1, 1.15; 709/203
See application file for complete search history.

(56) References Cited

U.S. PATENT DOCUMENTS

| | | | | |
|---|---|---|---|---|
| 6,453,078 B2 * | 9/2002 | Bubie et al. | .................... | 382/305 |
| 6,883,003 B2 * | 4/2005 | Nagahara | ................... | 1/1 |
| 6,967,728 B1 * | 11/2005 | Vidyanand | .................... | 358/1.12 |
| 7,207,735 B2 * | 4/2007 | Narusawa et al. | .............. | 400/76 |
| 7,277,192 B2 * | 10/2007 | Kotani et al. | ................ | 358/1.13 |
| 7,657,340 B2 * | 2/2010 | Lind | .............................. | 700/132 |
| 2002/0152279 A1 * | 10/2002 | Sollenberger et al. | ........ | 709/217 |
| 2006/0036734 A1 * | 2/2006 | Breeden et al. | ............... | 709/225 |
| 2006/0080539 A1 * | 4/2006 | Asami et al. | .................. | 713/182 |
| 2006/0235745 A1 * | 10/2006 | Yano | ................................ | 705/14 |
| 2008/0262925 A1 * | 10/2008 | Kim et al. | ........................ | 705/14 |
| 2009/0100374 A1 * | 4/2009 | Sheasby et al. | ............... | 715/788 |
| 2009/0282094 A1 * | 11/2009 | Hawkins | ........................ | 709/203 |

FOREIGN PATENT DOCUMENTS

JP 2005-157716 A 6/2005
JP 2005157716 A * 6/2005 ................ G06F 3/12

* cited by examiner

*Primary Examiner* — Akwasi M Sarpong
(74) *Attorney, Agent, or Firm* — Fitzpatrick, Cella, Harper & Scinto (57) ABSTRACT

Data specified by a distributor can be printed in an arrangement similar to that of the display state corresponding to the layout which is viewed by a person, to whom a printed matter is distributed, on the screen of his/her device in use. By specifying a user, i.e., the distribution destination for the printed matter, an information processing system can print the output data for a portlet application in accordance with the layout on the portal screen displayed by the user. In the portal server 102, the user information control section 205 manages the registration status of portlet application on a per-user or per-group basis and the layout information about print data. When a user or a group, i.e., the distribution destination for the printed matter, is specified, the output data for a portlet application is printed in accordance with the layout displayed on the portal screen set in the device used by the specified user, based on user information.

9 Claims, 10 Drawing Sheets

| GROUP NAME | USER NAME | LAYOUT INFORMATION | PORTLET APPLICATION |
|---|---|---|---|
| Gr.1 | User 1 | [1,1] | www.@@@.com/aaa.xml/ |
| | | [1,2] | www.@@@.com/bbb.xml/ |
| | | [2,1] | www.@@@.com/ccc.xml/ |
| | | [2,2] | www.@@@.com/ddd.xml/ |
| Gr.1 | User 2 | [1,1] | www.@@@.com/aaa.xml/ |
| | | [1,2] | www.@@@.com/ddd.xml/ |
| | | [2,1] | www.@@@.com/bbb.xml/ |
| Gr.2 | User 3 | [1,1] | www.@@@.com/bbb.xml/ |
| | | [1,2] | www.@@@.com/ccc.xml/ |
| | | [2,1] | www.@@@.com/aaa.xml/ |
| | | [2,2] | www.@@@.com/ddd.xml/ |

FIG. 9A
PRINT RESULT FOR USER 1

FIG. 9B
PRINT RESULT FOR USER 2

INFORMATION PROCESSING APPARATUS, INFORMATION PROCESSING METHOD, AND STORAGE MEDIUM

BACKGROUND OF THE INVENTION

1. Field of the Invention

The present invention relates to a print information processing technique for processing rendering data in accordance with a layout that is set on a per-user or per-group basis.

2. Description of the Related Art

In recent years, there has been a growing interest, originating from portal sites, in the concept of "enterprise portal". In the enterprise portal, by organizing information that is scattered throughout the intranet, such information can be displayed as a portlet for efficient usage. A portlet is a detachable user interface component that is managed and displayed on a portal server. Also, in the enterprise portal, layout settings can be made freely for each user, and each individual can customize the display and arrangement of the portlet, whereby a more efficient work area is provided for each user.

In general, the portlet for use when users operate as a team at the intranet level is essentially the same. However, even if the display content of the portlet is the same, each user often changes its arrangement to meet his/her preference. When data for a portal page is printed under such an environment, the data that is arranged on the display screen of a user who orders print execution is printed. When a distributor distributes a print result to his/her team members for information sharing among team members, the customization of the display screen set by each member loses meaning. In other words, when a person to whom a printed matter is distributed (recipient) has changed the layout or the arrangement of his/her display screen through customization, the changed layout or arrangement does not conform to the distributed printed matter, resulting in a difficult-to-understand layout with respect to what is arranged at which position thereof. Accordingly, there has been proposed a method in which the layout in accordance with the distributor's preference is registered in advance and is specified upon printing to make a recipient understand easily, resulting in a printed matter with a print layout in accordance with the distributor's preference (see Japanese Patent Laid-Open No. 2005-157716).

However, when the layout in accordance with the distributor's preference is specified for printout, original screen information becomes information for a user himself/herself who provides a print instruction, whereby the layout state displayed on a portal screen by a recipient cannot be reflected. Consequently, a printed matter, which has been printed with the layout that may be difficult to understand for the recipient, is distributed.

According to the present invention, data specified by a distributor can be printed in a similar arrangement to that of the display state corresponding to the layout which is viewed by a person, to whom a printed matter is distributed, on his/her portal screen.

SUMMARY OF THE INVENTION

In view of the foregoing, according to an aspect of the present invention, an information processing apparatus is provided that includes a storage unit configured to store user information including layout information about output data of an application for a first user and a second user; and a generation unit configured to generate rendering data such that output data, which is displayed for the benefit of the first user based on the user information, is arranged for printout in accordance with the layout information for the second user when the first user provides an instruction for print execution for the benefit of the second user.

According to the present invention, a printed matter, which is arranged in a similar manner to that of the layout of the screen set in a device used by a user, i.e., a recipient, is obtained.

Further features of the present invention will become apparent from the following description of exemplary embodiments with reference to the attached drawings.

DESCRIPTION OF THE EMBODIMENTS

Hereinafter, preferred embodiments of the present invention will now be described with reference to the accompanying drawings.

(First Embodiment)

Figure 1:
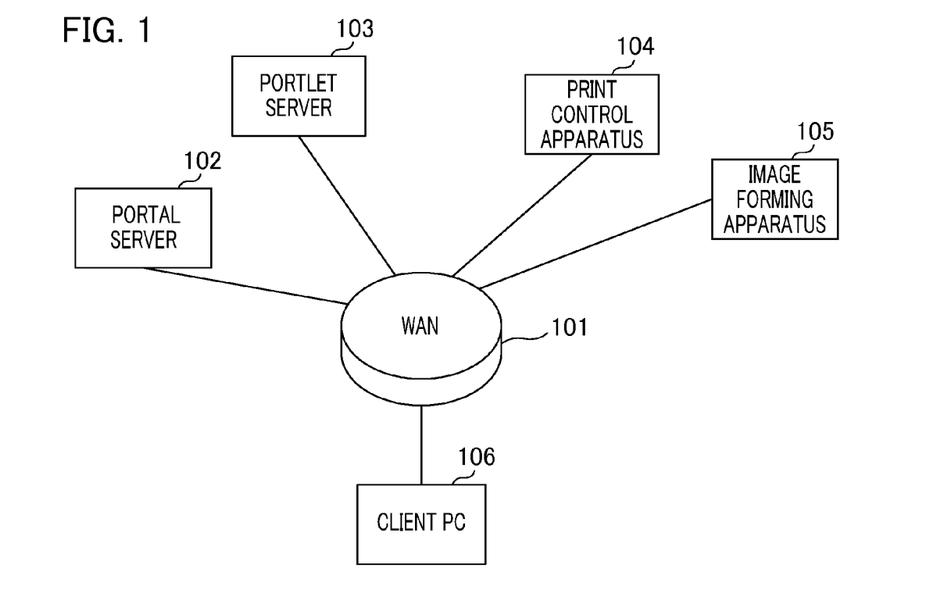
FIG. 1 is a block diagram illustrating an example of the configuration of the entire system in order to explain a hardware configuration according to the present invention in conjunction with FIGS. 2 to 6.

FIG. 1 is a block diagram illustrating an example of the configuration of the overall system according to one embodiment of the present invention. FIG. 1 shows an example of the information processing system according to the present embodiment applied to a portal system in which data print processing can be performed in accordance with a layout on a display screen set on a per-user or per-group basis and only functions required for each user can be registered. A portal server 102, a portlet server 103, a print control apparatus 104, and an image forming apparatus 105 are connected with a client PC 106 via a network 101 such as WAN (Wide Area Network) or the like. Note that the network 101 according to the present embodiment may not be limited to WAN but may be LAN (Local Area Network) or the like or may be wireless communication utilizing radio wave, light, or the like. Although, in practice, a plurality of information processing apparatuses is mutually connected via a communication network, FIG. 1 shows only a single apparatus representing each of the plurality of information processing apparatuses.

The portal server 102 collects and manages the output data for the portlet application provided by the portlet server 103, and provides information in response to the request from the client PC 106. On the display screen provided by the portal server 102, the output data for the portlet application provided by the portlet server 103 is collected and displayed, each user can change the display position of the output data for each portlet application.

Figure 2:
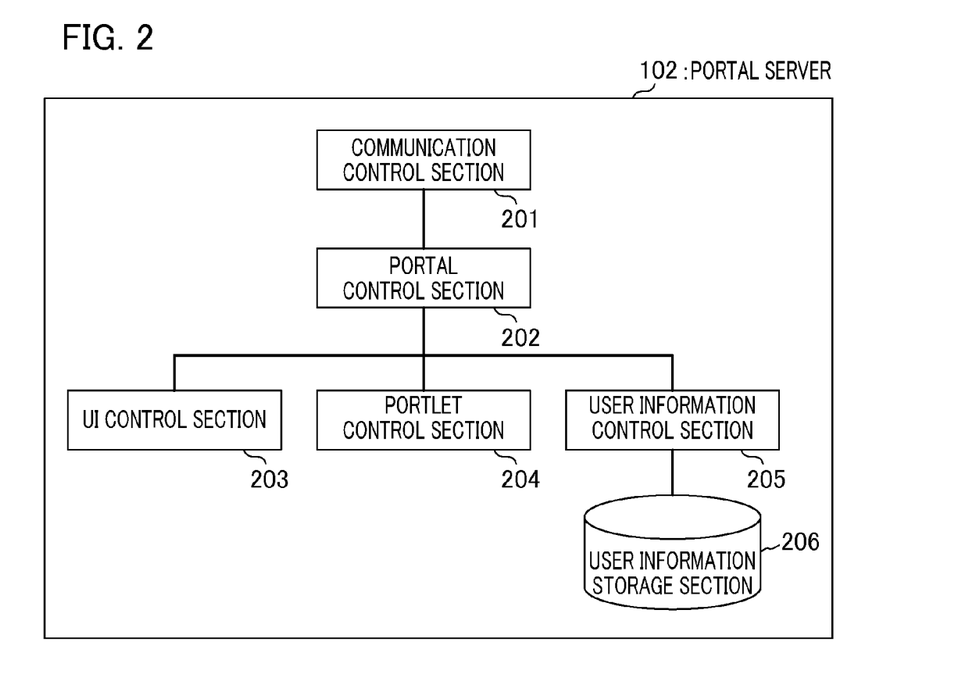
FIG. 2 is a diagram illustrating an example of the configuration of a portal server.

FIG. 2 is a diagram illustrating an example of the configuration of the portal server 102. A communication control section 201 exchanges information with the portlet server 103, the print control apparatus 104, and the client PC 106 via the network 101. A portal control section 202 controls a user interface (hereinafter referred to as "UI") control section 203, a portlet control section 204, and a user information control section 205 to thereby control the process within the portal server 102. The UI control section 203 sets the screen display layout of a portlet application, and generates the rendering data for the UI screen when information is displayed on the client PC 106. The portlet control section 204 acquires information from the portlet server 103, and performs acquisition and control of the output data for the portlet application capable of being displayed on a portal. For example, in the case of an intranet portal, a portal site dedicated for an intranet system, which customizes and displays intranet information in accordance with the business contents of employees, can be utilized.

The user information control section 205 constitutes a user information management unit in conjunction with a user information storage section 206, and manages a user who employs a portal. In other words, the user information control section 205 manages user information including the registration status of a portlet application on a per-user or per-group basis and layout information about the output data. The portlet application to be displayed on the client PC 106 by each user, the layout configuration to be displayed, and the control information and the UI control information that are required for the portlet application are stored in the user information storage section 206 as user information. Also, when a portal screen is displayed on the client PC 106, the user information storage section 206 reads user information from the user information storage section 206, and transmits it to the portal control section 202.

Figure 7A:
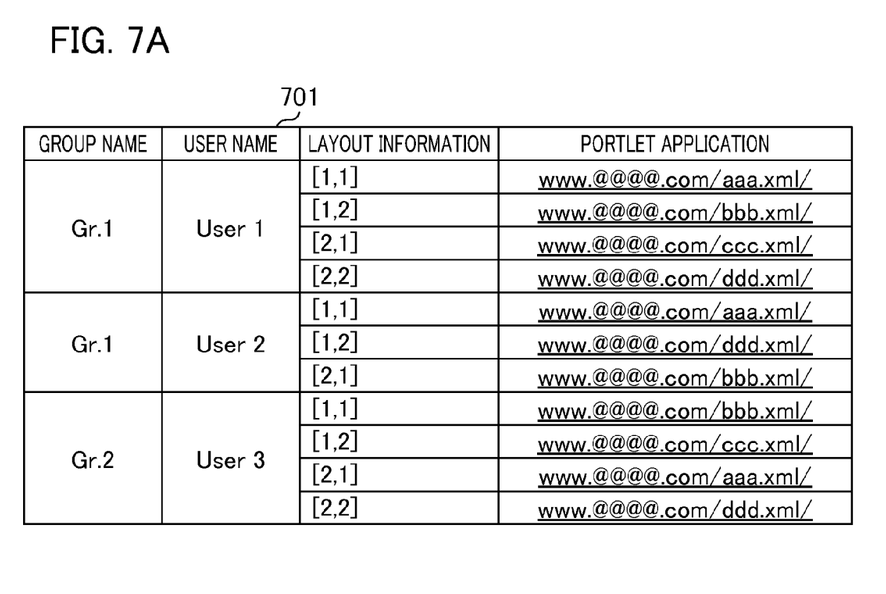
FIG. 7A is a diagram illustrating an example of user information stored in a portal server.

FIG. 7A is a diagram illustrating an example of user information stored in the user information storage section 206. User information 701 denotes a table that stores the registration status of the portlet application for each user who employs a portal and layout information. In the present example, a group name, a user name, layout information, and a portlet application are shown in the columns. Here, as indicated by [x, y] (where x and y are natural-number variables), the layout information for each user is stored in the user information storage section 206 as the position information described in the user information 701. An example of the relationship between the layout information and the layout position on the output data is shown as a layout 702 in FIG. 7B. Based on the layout information for the user information 701, the output data with which portlet application is arranged at which position is determined. For example, the layout information [1, 2] about the group name "Gr.1" and the user name "user 1" represents column 1 and line 2, and the descriptor file name (portlet name.xml) of a portlet application is "www.@@@@.com/bbb.xml". Note that, while the present example shows the layout information and the registration status of portlet application for each user who belongs to each group, information for each user can also be managed without using the group name.

Figure 3:
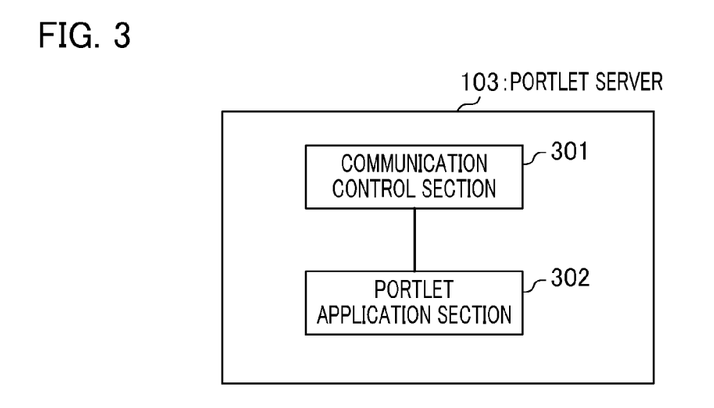
FIG. 3 is a diagram illustrating an example of the configuration of a portlet server.

The portlet server 103 provides the portlet application service to the portal server 102. Examples of portlet applications include document management, mail, news, and the like. FIG. 3 is a diagram illustrating an example of the configuration of the portlet server 103. A communication control section 301 exchanges information with the portal server 102 via the network 101. A portlet application section 302 provides the portlet application service in accordance with a request from the portal server 102.

Figure 4:
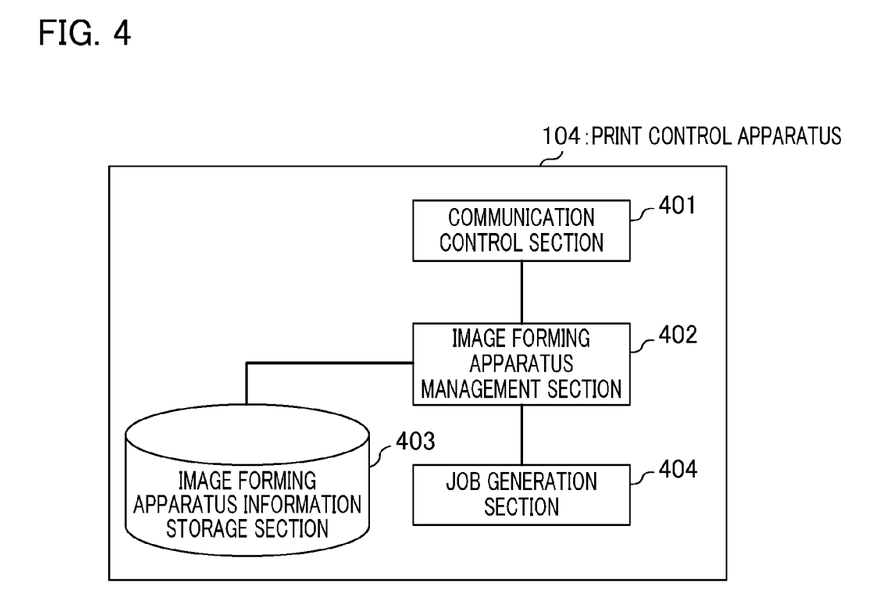
FIG. 4 is a diagram illustrating an example of the configuration of a print control apparatus.

The print control apparatus 104 has a function that manages the image forming apparatus 105 and generates and transmits a job suitable for the image forming apparatus 105 based on the rendering data received from the portal server 102. FIG. 4 is a diagram illustrating an example of the configuration of the print control apparatus 104. A communication control section 401 receives a print request from the client PC 106. An image forming apparatus management section (hereinafter referred to as "apparatus management section") 402 performs management control of the image forming apparatus 105. The apparatus management section 402, which has received a print request from the client PC 106, transmits the information, which is registered in an apparatus information storage section 403, about the image forming apparatus 105 to the client PC 106. The apparatus management section 402 makes a request to a job generation section 404 such that a job suitable for the image forming apparatus 105 specified by the client PC 106 is generated. The job generation section 404 generates a job (PDL) suitable for the image forming apparatus 105 specified from the apparatus management section 402 and transmits it to the image forming apparatus 105.

Figure 5:
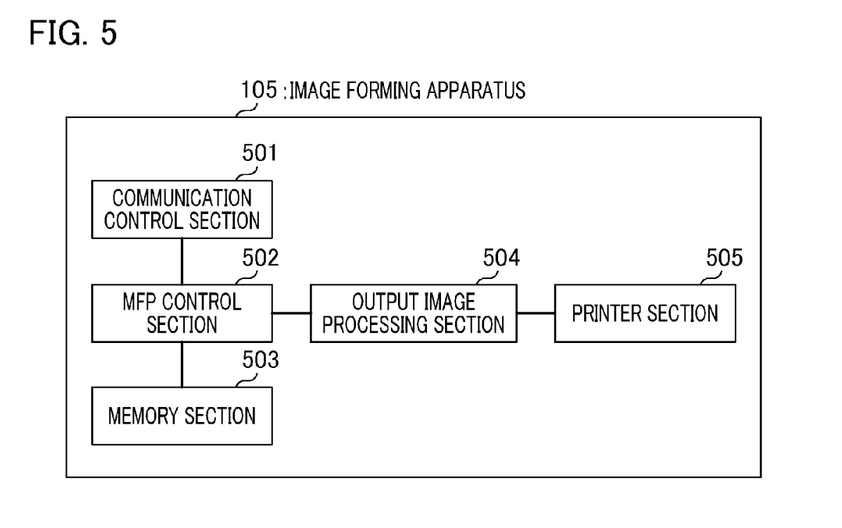
FIG. 5 is a diagram illustrating an example of the configuration of an image forming apparatus.

The image forming apparatus 105 performs printing in accordance with the job received by the print control apparatus 104. FIG. 5 is a diagram illustrating an example of the configuration of the image forming apparatus 105. A communication control section 501 transmits the input job to an MFP (Multi Function Peripheral) control section 502 via the network 101. The MFP control section 502 executes print processing in accordance with the job. The job, which has been input to the MFP control section 502, is temporarily stored in a memory section 503. This temporarily stored job is called up from the memory section 503 as required. An output image processing section 504 generates image data subjected to image processing for printing based on the job to transmit the image data to a printer section 505. The printer section 505 feeds a sheet of paper, and discharges the sheet of paper while sequentially printing the image data, which has been generated by the output image processing section 504, on the sheet of paper. Although the present example was described in relation to an MFP control as a preferred embodiment, various types of print apparatuses may be employed as the image forming apparatus 105. Examples of the print apparatus include a xerographic-type laser beam printer, an inkjet printer, a thermal transfer printer, and the like.

Figure 6:
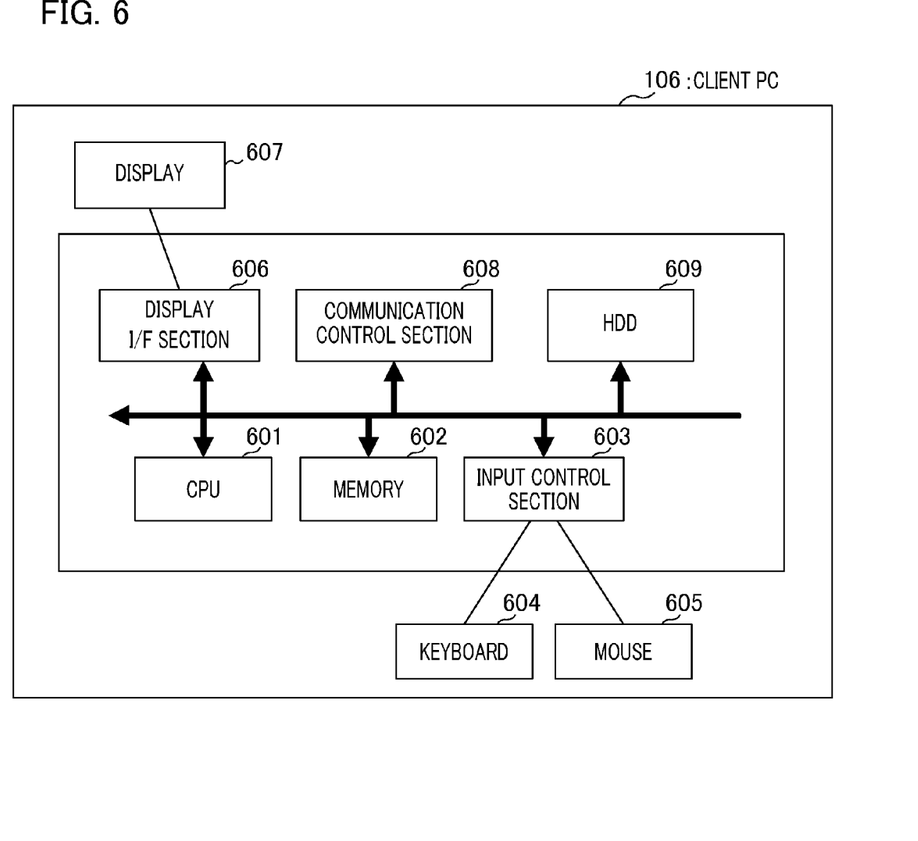
FIG. 6 is a diagram illustrating an example of the configuration of a client PC.

The client PC 106 has a function that displays the data on the display screen provided by the portal server 102, and provides an operation instruction while a user sees the display screen. FIG. 6 is a diagram illustrating an example of the configuration of the client PC 106. A CPU (Central Processing Unit) 601 executes processing in accordance with a program such as an operating system (OS), a Web browser, or the like. A program is stored in a memory 602 or is loaded from a HDD (Hard Disk Drive) 609 into a memory, and then is interpreted for execution. A communication control section 608 causes the memory 602 to store the information that has been received from the portal server 102 or the print control apparatus 104. An input control section 603 accepts and processes an input signal obtained from an operation unit such as a keyboard 604, a mouse 605, or the like. A display I/F (interface) section 606 causes a display 607 to display the data, which has been processed in accordance with the program executed by a CPU 601, as image information. Note that a computer-readable program for control according to the client PC 106 and the portal server 102 of the present embodiment is stored in an external storage device such as a memory, an HDD, or the like, and is executed by a CPU. Although FIG. 6 is shown as the hardware configuration of the client PC, a portal server, a portlet server, a print control apparatus, and an image forming apparatus have basically the same hardware configuration as that of the client PC.

Figure 8:
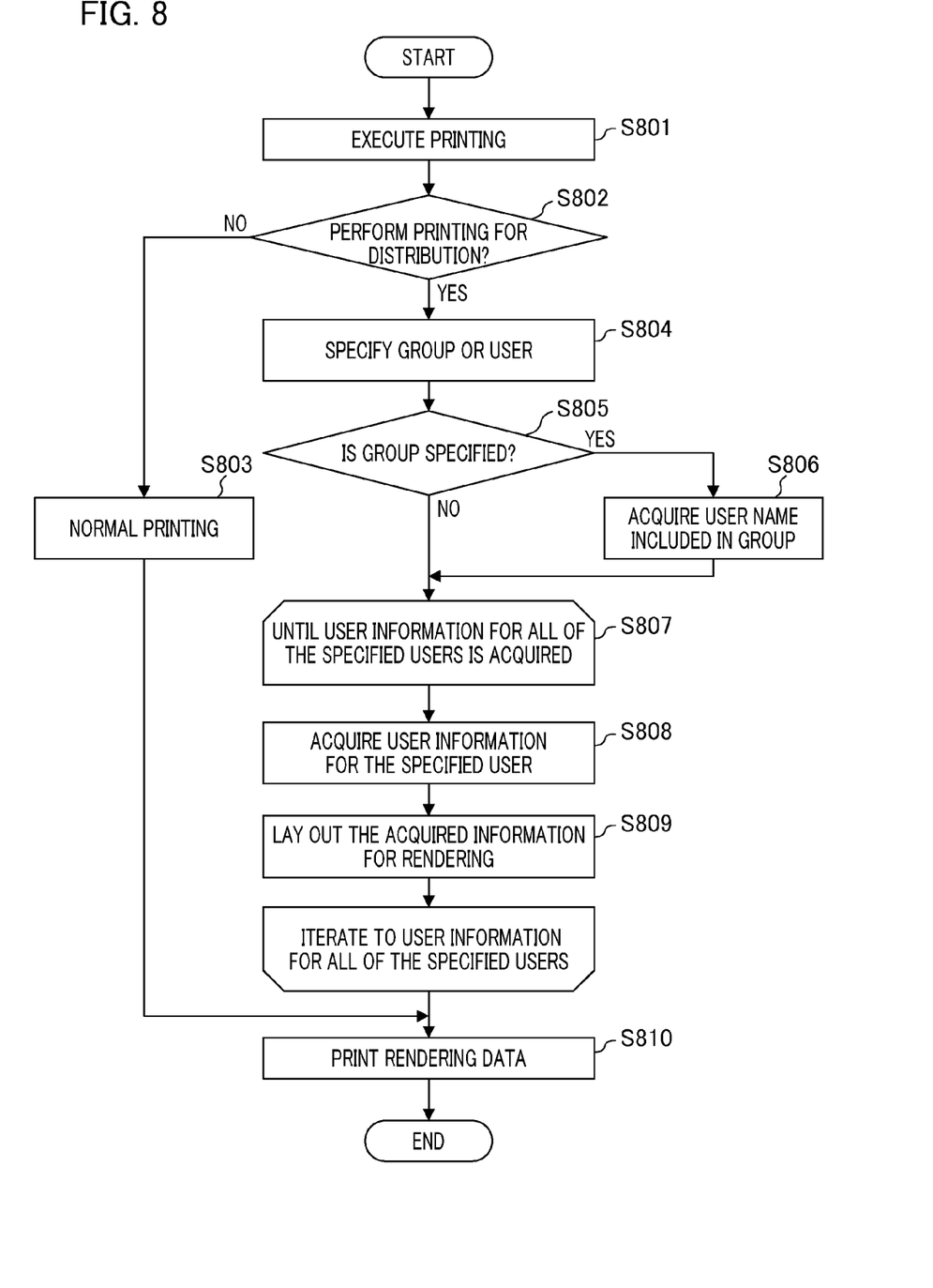
FIG. 8 is a flowchart illustrating an exemplary process of layout printing for distribution according to a first embodiment of the present invention.

Next, the flow of processing in a portal server that determines the configuration of the layout in order to perform layout printing for distribution will now be described with reference to the flowchart shown in FIG. 8. Note that the flowchart in the present example is realized by reading a program required for the flowchart and executing it by the CPU of a portal server. First, the portal server 102 accepts a print execution instruction from the client PC 106 (step S801). The portal server 102, which has received a print execution request, provides an inquiry regarding whether or not printing for distribution is to be performed to the client PC 106 (step S802). As a result, when the execution of printing for distribution is ordered, the process advances to step S804, whereas when the execution of normal printing is ordered, the process advances to step S803. In the case of normal printing, the portal server 102 generates rendering data using the portal data displayed on the screen of the client PC 106 that has issued a print execution request, and transmits the rendering data to the print control apparatus 104 for printout (step S810).

Figure 7B:
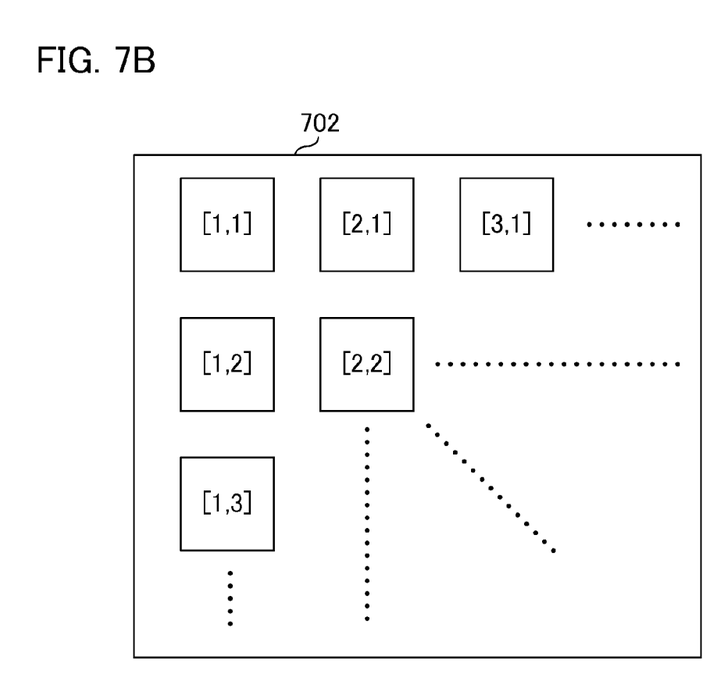
FIG. 7B is a diagram illustrating another example of user information stored in a portal server.

In the case of printing for distribution, the portal server 102 provides a specification screen for specifying a group or a user, to whom a printed matter is to be distributed, by the user of the client PC 106 based on the user information 701 shown in FIGS. 7A and 7B. Then, the portal server 102 accepts the specification of a group or a user from the client PC (step S804). Next, the portal server 102 determines whether or not a group is specified. When a group is specified, the process advances to step S806. After acquisition of the user name included in the group, the process advances to step S807. On the other hand, when a group is not specified, the process advances to step S807.

In step S807, iterative processing for repeatedly executing the processes in steps S808 and S809 is started. The portal server 102 acquires the user information about the specified user (step S808), and determines the layout arrangement from the layout information and the portlet application information included in the user information so as to render output data (step S809). The output data to be rendered here is the output data displayed on the screen of the user who has issued a print execution request. For example, assume that the output data 1 for a portlet application corresponding to www.@@@@.com/ccc.xml/ is displayed on the screen of the user 1 who has issued a print execution request, and the output data 2 for a portlet application corresponding to www.@@@@.com/ccc.xml/ is displayed on the screen of the user 2 to whom a printed matter is to be distributed. In this case, since the user 1 issues a print execution request, the portal server 102 generates the rendering data for the user 2 using the output data 1 displayed by the user 1. Note that the output data to be printed may be held by a portal server or may be acquired from a portlet server.

After the processes in steps S808 and S809 have been repeated for all of the specified users, the process advances to step S810. After the rendering data for all users has been generated, the portal server 102 transmits this rendering data to the print control apparatus 104 for printout.

Figure 9A:
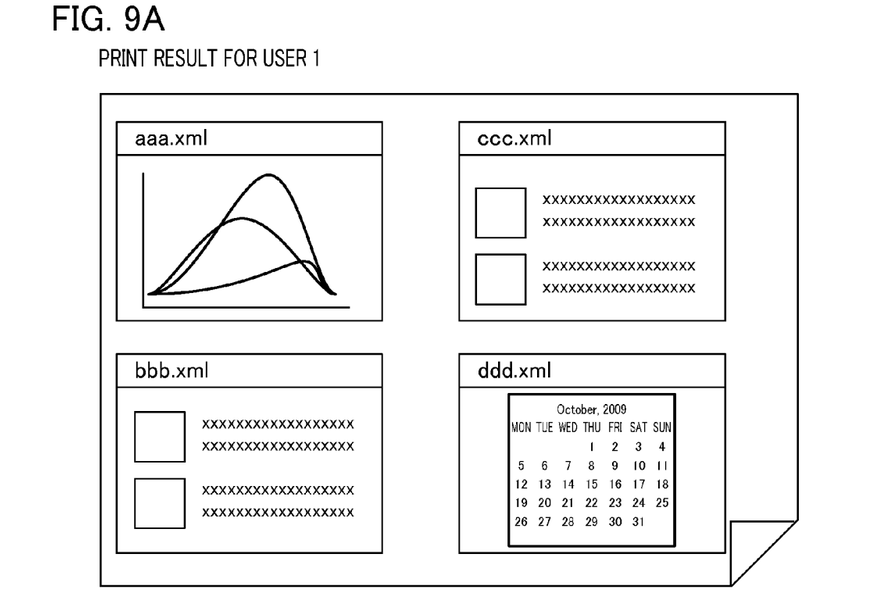
FIG. 9A is a diagram illustrating an exemplary print result intended by a user 1.
Figure 9B:
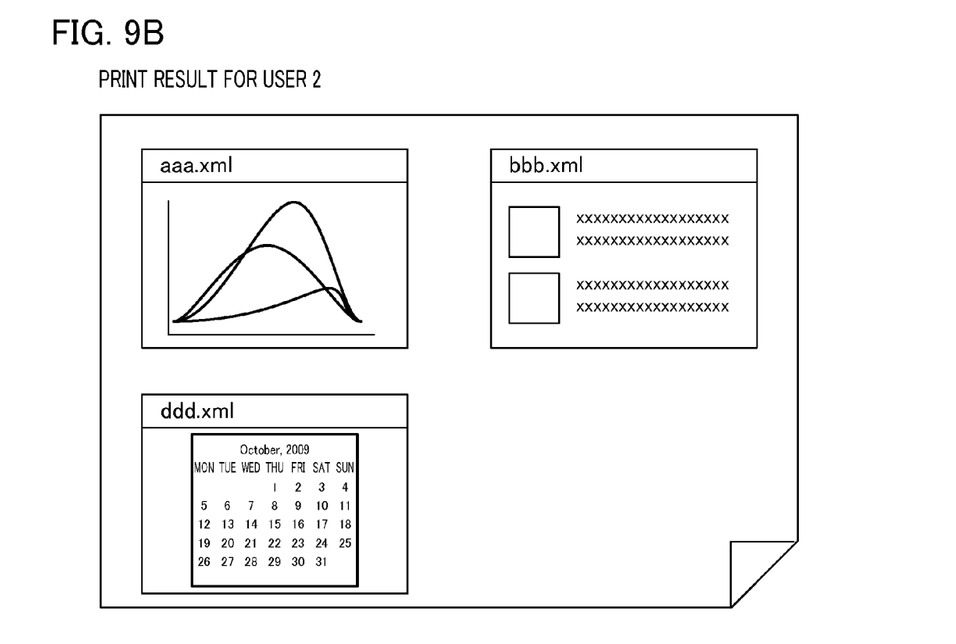
FIG. 9B is a diagram illustrating an exemplary print result intended by a user 2.

A description will be given of a print result with reference to the example shown in FIGS. 7A and 7B. When the group name Gr.1 is specified in the user information 701, the process advances from step S805 to step S806 shown in FIG. 8, and the user name "User 1" of a first user and the user name "User 2" of a second user, which are registered in Gr.1, are acquired. Print processing is executed using the layout information about these users (steps S807 to S810). Exemplary print results are shown in FIGS. 9A and 9B. The print result shown in FIG. 9A indicates the result of printing with the same layout as that displayed on the screen of User 1. In other words, the output data for the portlet application corresponding to the layout information [1, 1], [1, 2], [2, 1], and [2, 2] is arranged at the respective positions thereof. Note that FIGS. 9A and 9B show file names from which "www.@@@@.com" is removed and data in sets. The print result shown in FIG. 9B indicates the result of printing that uses the same layout as that displayed on the screen of User 2. In this way, in accordance with the layout information for each user, a printed matter can be generated using the same layout as that of the portal screen normally displayed for each user who is a recipient. In other words, a recipient can receive a printed matter with the same layout as that of the display screen being viewed thereby.

(Second Embodiment)

Next, a description will be given of a second embodiment of the present invention. In the first embodiment, when printing is performed using the layout displayed for each user, it may happen that the output data for a portlet application, which must be included in a printed matter for distribution, may be absent depending on user's setting. An example of such event includes a case where a user of a distribution destination has intentionally deleted a particular portlet application from the layout on the display screen. Hence, in the second embodiment, a description will be given of processing for specifying the portlet application to ensure printing and thereby print the output data for the application without exception. Note that a system configuration diagram and a hardware configuration diagram according to the second embodiment and a third embodiment to be described below are the same as that in the first embodiment, and thus their description will not be given here.

Figure 10A:
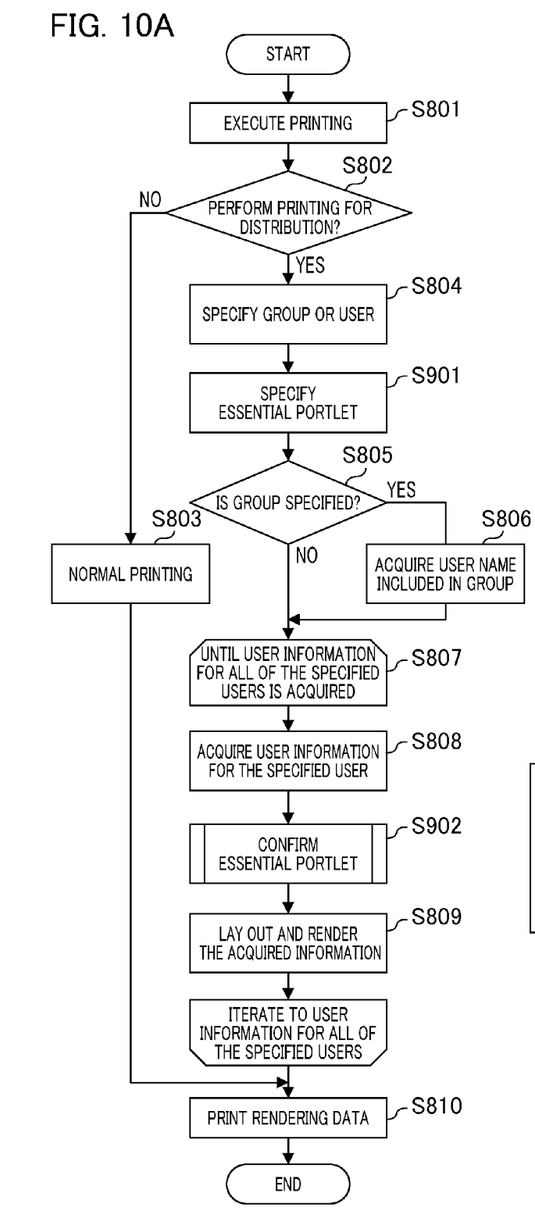
FIG. 10A is a flowchart illustrating an exemplary process of layout printing for distribution according to a second embodiment of the present invention.
Figure 10B:
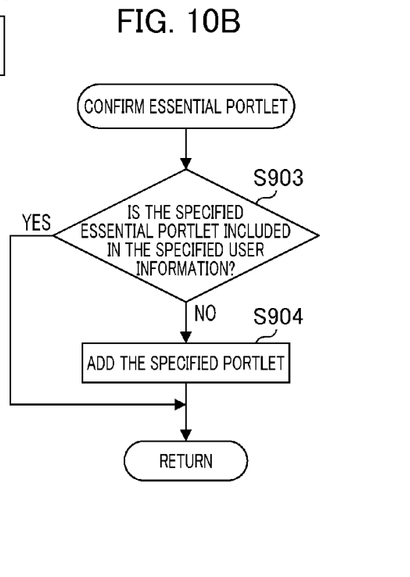
FIG. 10B is a flowchart illustrating the essential portlet confirmation processing performed by an exemplary process of layout printing for distribution according to the second embodiment of the present invention.

Hereinafter, the flow of processing will be described with reference to the flowchart shown in FIGS. 10A and 10B. Note that, in FIG. 10A, a description will not be given of the same steps as those shown in FIG. 8, and thus will be given of the processes in steps S901 to 904.

Step S901 is located between steps S804 and S805, the portal server 102 accepts the specification of the essential portlet application which a user wishes to include for printout, from the client PC 106.

After step S808, the process advances to step S902, and confirmation processing for the essential portlet application is performed. The flow of processing is shown in FIG. 10B. The present process determines whether or not the specified portlet application is included in the specified user information 701.

First, the portal server 102 determines whether or not the essential portlet application which a user wishes to include for printout is included in the user information 701 for the user to whom a printed matter is to be distributed (step S903). As a result, when the portlet application is not included in the user information 701, the process advances to step S904. Here, processing for adding information indicating the specified portlet application to the specified user information is carried out to thereby update layout information. A position where output data is added on a layout is not particularly defined. An example of such method includes a method for confirming the coordinate values of the vertical axis and the horizontal axis of layout information starting from a smallest one to thereby arrange output data at locations having the smallest coordinate values. Then, rendering data is generated in step S809. In step S903, when the user information 701 for the specified user includes an essential portlet application which a user wishes to include for printout, the process ends without doing anything, and the process advances to step S809.

According to the second embodiment, the output data for a portlet application, which must be included in a printed matter intended by a distributor, can be included in the print result regardless of user's layout setting.

(Third Embodiment)

Next, a description will be given of a third embodiment of the present invention. In the second embodiment, when portlet application is added that a distributor wishes to include for printout without exception, there is a possibility that it cannot be immediately known whether such information is originally included in the layout screen or is newly added. Hence, in the third embodiment, when portlet application certain to be printed is added, a user who has ordered print execution is notified about information about a user who has added and the additional position of output data. Hereinafter, a description will be given of notification processing with reference to FIGS. 11A and 11B to FIGS. 13A and 13B.

Figure 11A:
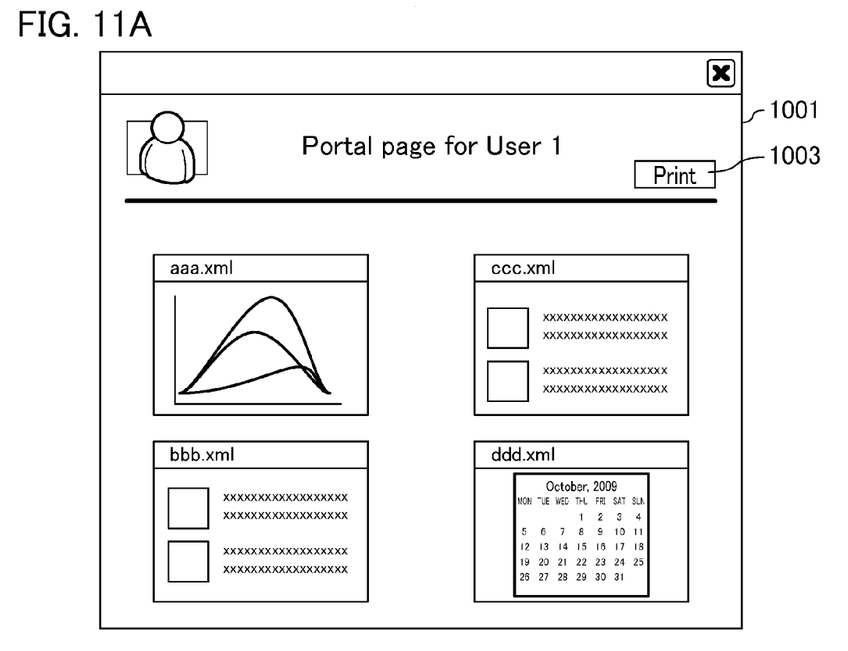
FIG. 11A is an exemplary illustration of a portal screen for the user 1 in order to explain a third embodiment of the present invention.
Figure 11B:
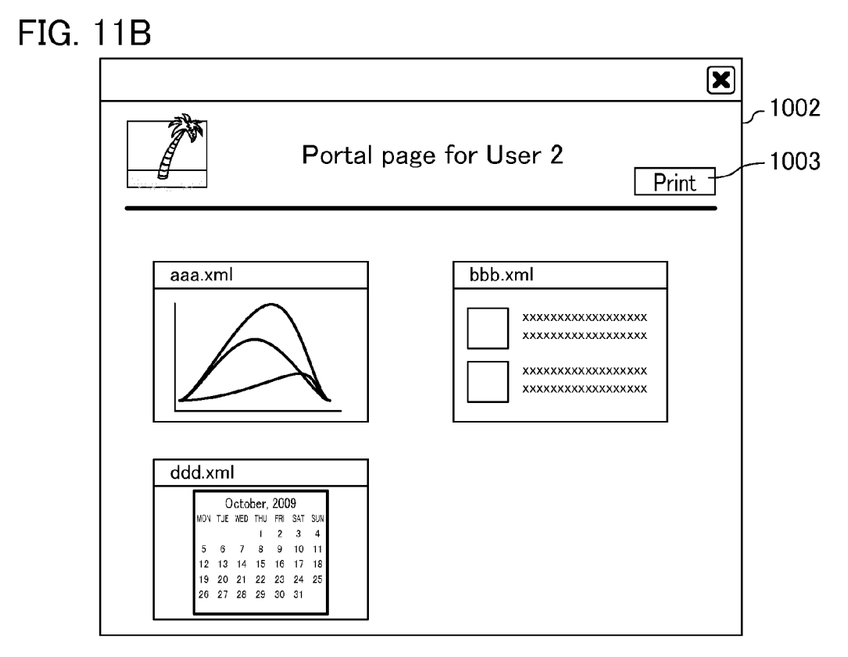
FIG. 11B is an exemplary illustration of a portal screen for the user 2 in order to explain the third embodiment of the present invention.
Figure 12A:
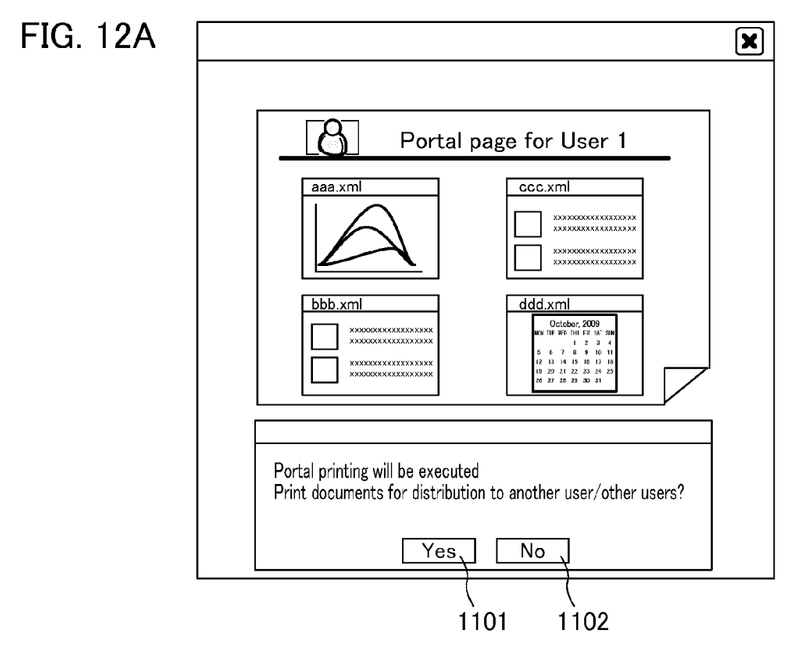
FIG. 12A is a diagram illustrating an example of a UI screen according to printing for distribution.

Each of FIGS. 11A and 11B is a diagram illustrating an example of a UI display screen with a layout based on the user information 701. A screen 1001 shown in FIG. 11A indicates an example of the portal UI of the user name "User 1", and a screen 1002 shown in FIG. 11B indicates an example of the portal UI of the user name "User 2". When a button 1003 on the UI screen 1001 is operated from the client PC 106, the portal server 102 generates rendering data for providing the UI screen shown in FIG. 12A, and provides it to the client PC 106. FIG. 12A is a diagram illustrating an example of the UI screen to be displayed when print execution is determined in S802. In the present example, when portal printing is executed, buttons 1101 and 1102 for selecting whether or not a documentation which is distributed to another user or other users is printed are provided. When the button 1101 is selected, the process is transferred to step S804 shown in FIG. 10A. When the button 1102 is selected, the process is transferred to step S803.

Figure 12B:
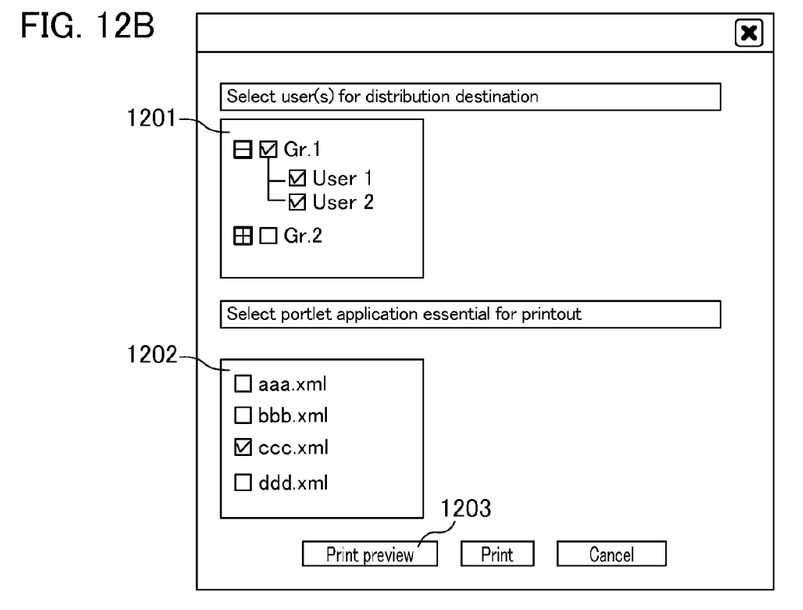
FIG. 12B is a diagram illustrating another example of a UI screen according to printing for distribution.
Figure 13A:
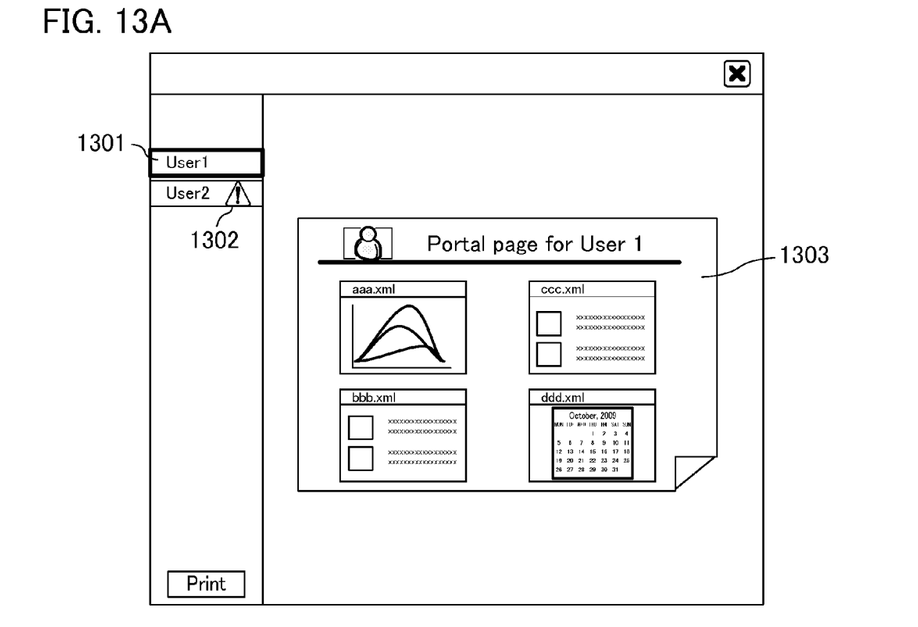
FIG. 13A is a diagram illustrating an example of a UI screen for displaying a layout position when the user 1 who has added portlet application is notified.
Figure 13B:
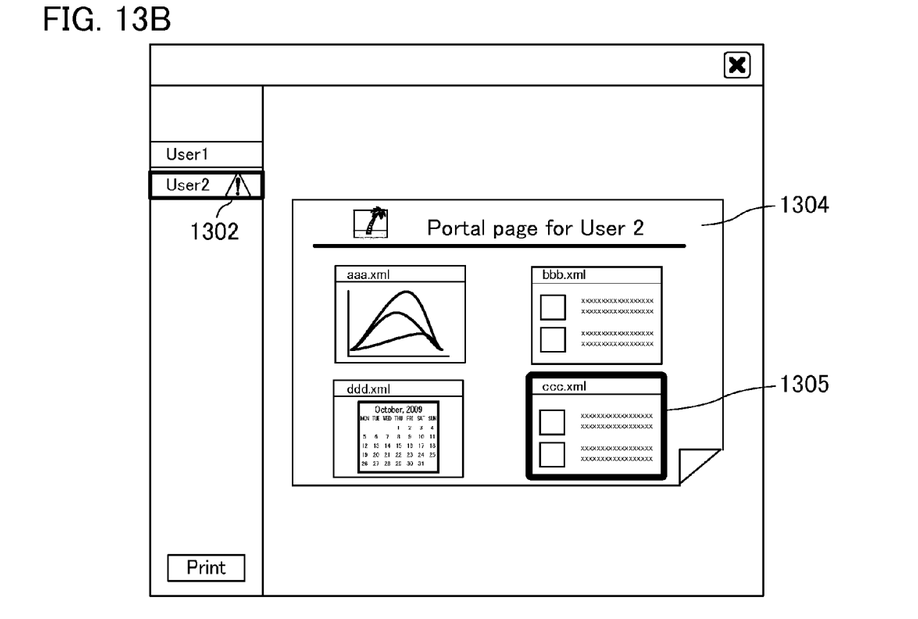
FIG. 13B is a diagram illustrating an example of a UI screen for displaying a layout position when the user 2 who has added portlet application is notified.

FIG. 12B is a diagram illustrating an example of the UI screen for use in specification when a printed matter is generated in accordance with the layout displayed for each user. Note that the UI screen is displayed, and as a result, a portal server generates rendering data for displaying the UI screen and provides it to the client PC. In the present embodiment, when distribution to another user or other users is specified (when the button 1101 is specified), the UI screen shown in FIG. 12B is displayed. Operation elements (in the present example, check boxes) for specifying a user of distribution destination are provided on an upper area 1201. Also; operation elements (in the present example, check boxes) for specifying a portlet application, which must be included in a printed matter for distribution, are provided on a lower area 1202. A print preview button 1203 below the lower area 1202 is a button for executing a preview display in which a print result is preliminarily displayed. Each of FIGS. 13A and 13B is an exemplary screen about the layout position when the button 1203 is operated and a print preview is thereby displayed. A left-side display area 1301 shown in FIG. 13A is an area that displays the name of a user who has been selected by the area 1201 shown in FIG. 12B. A user list for printout is displayed on the area 1201, and the icon indicated by a reference numeral 1302 is added to the user name (in the present example, User 2) to whom a portlet application that will certainly be printed has been added. In this manner, when the output data for the portlet application for which a distributor wishes to include without exception is added, whether output data is added to which user can be immediately identified. When the user name "User 1" indicated in a display area 1301 is selected, the essential portlet for printout has already been registered as shown in a print preview example 1303, and thus it can be understood that output data is not added. In contrast, when the user name "User 2", to which the icon indicated by the reference numeral 1302 was added, is selected as shown in FIG. 13B, the additional portion indicated by the reference numeral 1305 is displayed so as to be distinguishable from others on an exemplary print preview 1304. In other words, when the output data for a portlet application that will certainly be printed is added, it is easy to understood that the portlet application is notified as indicated by the reference numeral 1305 while displaying with emphasis the added position thereof. In addition, the emphasized display may be reflected in the print result. Consequently, a recipient can easily recognize that output data displayed with emphasis is the added data.

According to the third embodiment, when a distributor adds the output data for a portlet application that will certainly be printed to the print result, the user name of a recipient and the position at which data has been added can be confirmed on the display screen.

(Other Embodiments)

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-020021 filed Feb. 1, 2010 which is hereby incorporated by reference herein in its entirety.

What is claimed is:

1. An information processing apparatus comprising:
a storage unit configured to store first layout information for a first user and second layout information for a second user;
a provision unit configured to provide the first user with a first screen in which a plurality of contents are arranged based on the first layout information, and provide the second user with a second screen in which the plurality of contents are arranged based on the second layout information, wherein a layout relationship between the plurality of contents in the first screen differs from a layout relationship between the plurality of contents in the second screen; and
a generation unit configured to generate first rendering data for outputting a first printed matter for the first user in which the plurality of contents are arranged based on the first layout information and second rendering data for outputting a second printed matter for the first user in which the plurality of contents are arranged based on the second layout information when a print instruction through the first screen has been received,
wherein a relationship between the plurality of contents in the first printed matter is the same as that between the plurality of contents in the first screen, and a relationship between the plurality of contents in the second printed matter is the same as that between the plurality of contents in the first screen, and
wherein, if the number of the contents displayed on the first screen differs from the number of the contents displayed on the second screen, the number of the contents arranged on the first printed mater differs from the number of the contents arranged on the second printed matter.

2. The information processing apparatus according to claim 1,
wherein the storage unit further stores a registration status of each of the plurality of contents for the first user and the second user, and
wherein, when a content to be included in a printed matter is not included in the second layout information of distribution destination based on the registration status, the generation unit adds the content not included in the second layout information to the second layout information to thereby update the second layout information, and generates the second rendering data in accordance with the updated second layout information.

3. The information processing apparatus according to claim 2, wherein, when the content not included in the second layout information is added to the second layout information, the generation unit generates the second rendering data such that the second printed matter distinguishes the added content from the other content.

4. An information processing method comprising the steps of:
storing first layout information for a first user and second layout information for a second user;
providing the first user with a first screen in which a plurality of contents are arranged based on the first layout information, user, and providing the second user with a second screen in which the plurality of contents are arranged based on the second layout information, wherein a layout relationship between the plurality of contents in the first screen differs from a layout relationship between the plurality of contents in the second screen; and
generating first rendering data for outputting a first printed matter for the first user in which the plurality of contents are arranged based on the first layout information and second rendering data for the second user for outputting a second printed matter in which the plurality of contents are arranged based on the second layout information when a print instruction has been received through the first screen,
wherein a relationship between the plurality of contents in the first printed matter is the same as that between the plurality of contents in the first screen, and a relationship between the plurality of contents in the second printed matter is the same as that between the plurality of contents in the first screen, and
wherein, if the number of the contents displayed on the first screen differs from the number of the contents displayed on the second screen, the number of the contents arranged on the first printed matter differs from the number of the contents arranged on the second printed matter.

5. A non-transitory storage medium storing a computer program for executing the steps of:
storing first layout information for a first user and second layout information for a second user;
providing the first user with a first screen in which a plurality of contents are arranged based on the first layout information, and providing the second user with a second screen in which the plurality of contents are arranged based on the second layout information, wherein a layout relationship between the plurality of contents in the first screen differs from a layout relationship between the plurality of contents in the second screen; and
generating first rendering data for outputting a first printed matter for the first user in which the plurality of contents are arranged based on the first layout information and second rendering data for the second user for outputting a second printed matter in which the plurality of contents are arranged based on the second layout information when a print instruction has been received through the first screen,
wherein a relationship between the plurality of contents in the first printed matter is the same as that between the plurality of contents in the first screen, and a relationship between the plurality of contents in the second printed matter is the same as that between the plurality of contents in the first screen, and
wherein, if the number of the contents displayed on the first screen differs from the number of the contents displayed on the second screen, the number of the contents arranged on the first printed matter differs from the number of the contents arranged on the second printed matter.

6. The information processing method according to claim 4,
wherein the storing step further stores a registration status of each of the plurality of contents for the first user and the second user, and wherein, when a content to be included in a printed matter is not included in the layout information for the second user of distribution destination based on the registration status, the generation step further adds the content not included in the second layout information to the second layout information to thereby update the second layout information, and generates the second rendering data in accordance with the updated second layout information.

7. The information processing method according to claim 6, wherein, when the content not included in the second layout information is added to the second layout information, the generation step further generates the second rendering data such that the second printed matter distinguishes the added content from the other content.

8. The non-transitory storage medium according to claim 5,
wherein the storing step further stores a registration status of each the plurality of contents for the first user and the second user, and
wherein, when a content to be included in a printed matter is not included in the layout information for the second user of distribution destination based on the registration status, the generation step further adds the content not included in the second layout information to the second layout information to thereby update the second layout information, and generates the second rendering data in accordance with the updated second layout information.

9. The non-transitory storage medium according to claim 8, wherein, when the content not included in the second layout information is added to the second layout information, the generation step further generates the second rendering data such that the second printed matter distinguishes the added content from the other content.

* * * * *